(12) United States Patent
Nguyen

(10) Patent No.: US 7,300,336 B1
(45) Date of Patent: Nov. 27, 2007

(54) MEDIA CONTROL VALVE

(76) Inventor: Phuong Taylor Nguyen, 5603 Bridlewood Dr., Richmond, TX (US) 77469

( * ) Notice: Subject to any disclaimer, the term of this patent is extended or adjusted under 35 U.S.C. 154(b) by 0 days.

(21) Appl. No.: 11/504,407

(22) Filed: Aug. 15, 2006

(51) Int. Cl.
*B24C 7/00* (2006.01)

(52) U.S. Cl. .......................................... 451/101; 451/99

(58) Field of Classification Search ................ 451/101, 451/99, 75; 251/60, 63.5, 205; 137/553
See application file for complete search history.

(56) References Cited

U.S. PATENT DOCUMENTS

| | | | | |
|---|---|---|---|---|
| 5,401,205 A | * | 3/1995 | Shank, Jr. .................... | 451/101 |
| 5,421,767 A | * | 6/1995 | Spears et al. ................ | 451/101 |
| 5,542,873 A | * | 8/1996 | Shank, Jr. ..................... | 451/75 |
| 5,810,045 A | * | 9/1998 | Evans ......................... | 137/312 |
| 6,607,175 B1 | * | 8/2003 | Nguyen et al. ............ | 251/63.5 |

* cited by examiner

*Primary Examiner*—Dung Van Nguyen

(57) ABSTRACT

The present invention is related to valves for the controlling the flow of media. For example, the valves of the present invention may control the flow of solid media into a fluid stream. More, specifically, the valves of the present invention may be used to control the flow of a blasting media into an air stream as part of a blasting apparatus for treatment of a surface. The valve body houses a sleeve for accepting a plunger for opening and closing a media opening in the valve. The sleeve includes a hardened liner and a softer outer jacket. The plunger engaging portion of the jacket is of a larger diameter than the plunger engaging portion of the liner to create a gap between the plunger and the soft jacket portion of the sleeve.

5 Claims, 5 Drawing Sheets

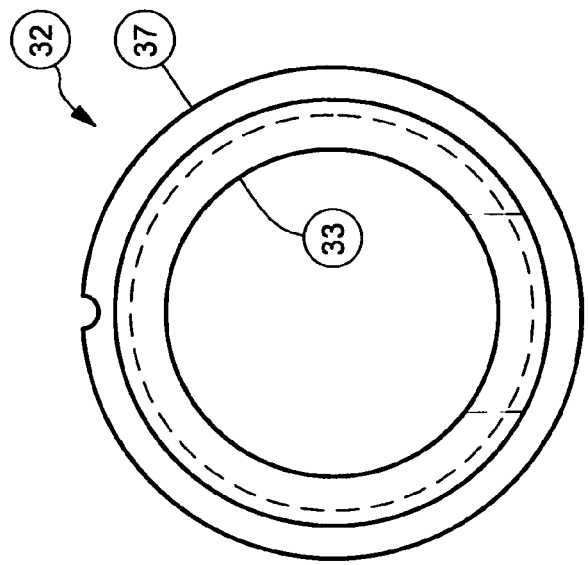
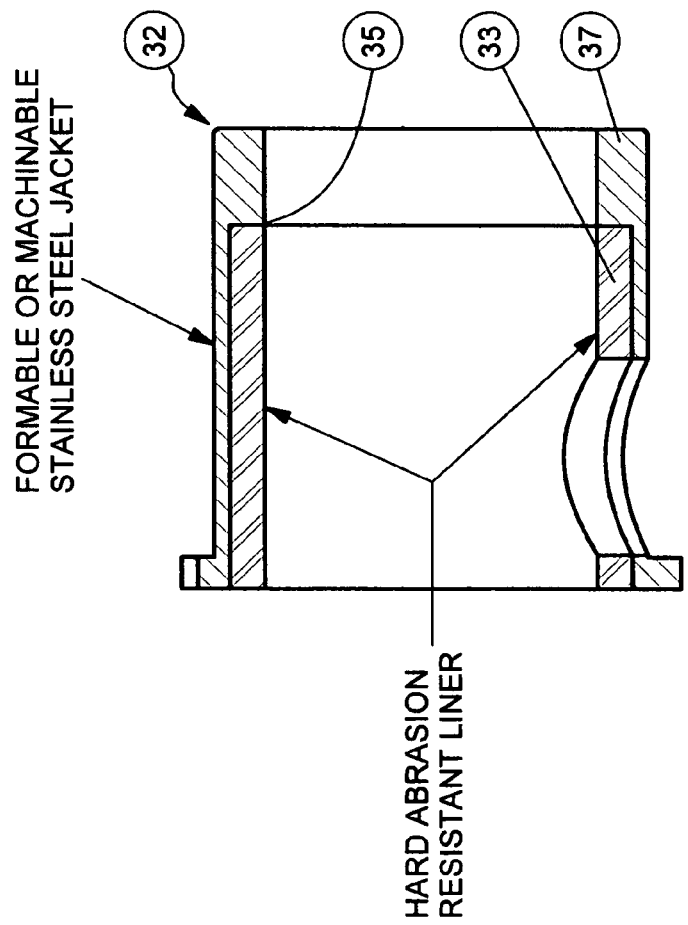
(PRIOR ART) FIG. 6
(PRIOR ART) FIG. 5
TYPICAL RIGID SLEEVE DESIGN

MEDIA CONTROL VALVE

BACKGROUND OF THE INVENTION

1. Field of the Invention

The present invention is related to media control and, more specifically, media control valves used to control the flow of a media into a fluid stream as part of an apparatus for treatment of a surface, and is particularly directed to a remote ON/OFF type media control valve with manual abrasive flow metering.

2. Description of the Related Art

A typical media control valve is disclosed in U.S. Pat. No. 3,476,440 ("the '440 patent"), which is hereby incorporated by reference in its entirety. The valve of the '440 patent is attached to a media vessel and controls the flow of the media from the media vessel into a conduit containing a fluid stream. This conduit terminates in a nozzle. Fluid and media pass through the nozzle at high speed and are typically used to treat surfaces.

Over the years many modifications to media control valves have been proposed. For example, U.S. Pat. No. 5,810,045 ("the '045 patent") discloses a valve for introducing particulate materials into a high-pressure air stream and suggests several uses for this valve. For example, the '045 patent suggests that the valve may be used for purposes such as introducing fluid catalytic cracking catalyst particles into fluid catalytic cracking units used to crack and reform various petroleum based products, introducing particulate catalysts into other kinds of chemical processes and spraying particulate ingredients on adhesive substrates as part of various manufacturing processes. U.S. Pat. No. 5,407,379 ("the '379 patent") and U.S. Pat. No. 5,401,205 ("the '205 patent") disclose a media control valve having a media passage between the media control valve and the conduit. The media passage converges into a slot-shaped outlet in the conduit so as to reduce the perimeter of the outlet placed perpendicular to air flow and consequently reduce turbulence as air passes across the outlet. The '045 patent also includes the use of multiple seals around a plunger of the valve with an exhaust therebetween to remove any contaminants that breach the seals.

One of the most critical issues with media control valves is the life of the valve. The abrasive media can damage the valve beyond use in a short period of time, requiring replacement or substantial repair. The valves of the prior art, as particularly shown in the '440 and '045 patents, typically have a sleeve that consists of a hardened liner (tungsten carbide or hardened steel) jacketed with a softer material. In these configurations, the hard liner is jacketed and bonded with stainless steel with the ID of the jacket being flush with the ID of the hard liner. The valve plunger is of the same type construction, except that the jacket is a hard material and the inside is a softer more workable material. It is not uncommon for any of these valves to malfunction after some use due to the sleeve and plunger locking up, thereby not allowing the plunger to reciprocate within of the sleeve. When plungers lock up or seize, accelerated wear is resulted on the adjacent components of the valve such as the body, seat, and base.

The '045 patent purports to keep particulates from entering the cylinder chamber, and thereby improve the life of the valve. However, this patent does not address the more frequent mode of failure where the plunger binds against the sleeve. Further, the statement that the '045 design of the plunger and sleeve block the migration of particles past the assembly simply is not correct. A gap is required for assembly of the plunger into the sleeve. Even with a gap of 0.001" gap particles will migrate past the gap.

The design of the prior art would experience frequent seizing or locking up between the plunger and the sleeve jacket ID, which is designed to machine flush with the ID of the hard liner. After years of extensive experimentation and study it has been determined that this seizing can be attributed to several factors. First, the stainless jacket on the sleeve wears at the ID more quickly than at the hard liner primarily because of the difference in hardness of the two materials. This creates a beveled surface between the sleeve stainless ID and plunger OD where particles would cause binding. In addition, the stainless ID section of the sleeve is softer than some of the abrasive media used, such as aluminum oxide grit or hardened steel grit. These harder particles can dig into the relatively softer yet still rigid stainless steel and cause binding between the plunger and sleeve.

There is a need for a valve system having a longer life in order to increase the efficiency of the overall system.

SUMMARY OF THE INVENTION

According to one embodiment of the present invention, a media control valve is provided including a valve body having a media inlet and a media outlet, and a plunger and sleeve positioned within the valve body. The media control valve also includes a media opening in the sleeve having a first portion proximate to the media outlet and a second portion distal to the media outlet, wherein the second portion is broader than the first portion. The media control valve further includes a housing connected to the valve body, a piston positioned within the housing and connected to the plunger, and a base connected to the valve body in communication with the media outlet.

It is an important feature of the invention that a gap is provided at the junction between the sleeve jacket and liner. This gap or offset eliminates the wear and seizing problems of the prior art. The gap or offset is sized as such that any particles that propagate and accumulate into the void will roll against other particles or adjacent surfaces instead rubbing against either the stainless portion of the sleeve or the plunger. This rolling eliminates or minimizes the abrasion on the stainless ID of the sleeve. Further, harder particles cannot dig into the stainless ID of the sleeve. Specifically, this design allows particles to only "rub" on harder surfaces, which should crush the particles and minimize any tendency of the valve to bind. The gap provides separation of particles from adjacent surfaces (sleeve and plunger) such that the adjacent plunger seal life is extended due to less severe wear factors. It has been found that this results in a significant increase in the useable life of the valve.

In the preferred embodiment of the invention, the media control valve, includes a valve body having a media inlet and a media outlet for delivering particulate media through the valve with a plunger positioned within the valve body and a sleeve positioned within the valve body for receiving the plunger. There is a media opening in the sleeve. A piston is positioned within the housing and connected to the plunger, wherein the plunger is constructed and arranged to be movable by the piston with respect to the media opening to provide all metering positions from a fully closed position to a fully open position. The sleeve comprises an outer jacket made of a first material and having at least one ID sufficient to accommodate the plunger. A liner is placed inside a portion of the sleeve and has an ID sufficient to accommodate the plunger, wherein the ID of the liner is smaller than the at least one ID of the sleeve. Typically, the outer jacket is made of a material that is softer than the material of the liner. In the preferred embodiment the differences in the IDs of the liner and the jacket create a gap between the plunger and the sleeve at the junction of the liner and the jacket, wherein the gap is larger than the largest particle that is able to propagate and accumulate therein. It is desirable to include a resilient seal between the sleeve and the body.

BRIEF DESCRIPTION OF THE DRAWINGS

FIGS. 5 and 6 (PRIOR ART) show the sleeve and liner configuration of prior art media control valves.

DETAILED DESCRIPTION OF THE PREFERRED EMBODIMENTS

The present invention is directed to a valve for controlling the flow of a media to a fluid stream, referred to herein as a media control valve. By media, it is meant any material or materials that may be desired to be added to another material or materials. While various solid, fine particulate, blasting media, such as sand, metal shot, and the like, are used by way of example herein, the media that may be supplied by the media control valve of the present invention is not so limited, and may include a wide variety of materials including liquids and gasses as well as solid particles.

In one embodiment, the media control valve of the present invention includes a valve body having a media inlet and a media outlet. A housing is connected to the valve body. A plunger is positioned within the valve body and is connected to a piston positioned within the housing. A base is connected to the valve body such that it communicates with the media outlet. The media control valve of this embodiment may further include a sleeve disposed between the valve body and the plunger. This sleeve may contain a media opening. In some embodiments of the media control valve of the present invention, the media opening has a first portion proximate to the media outlet and a second portion distal to the media outlet, the second portion being broader than the first portion. In other embodiments of the invention, the piston includes a contaminant isolation region. These and other specific embodiments of the invention will now be described with reference to the Figures.

Figure 1:
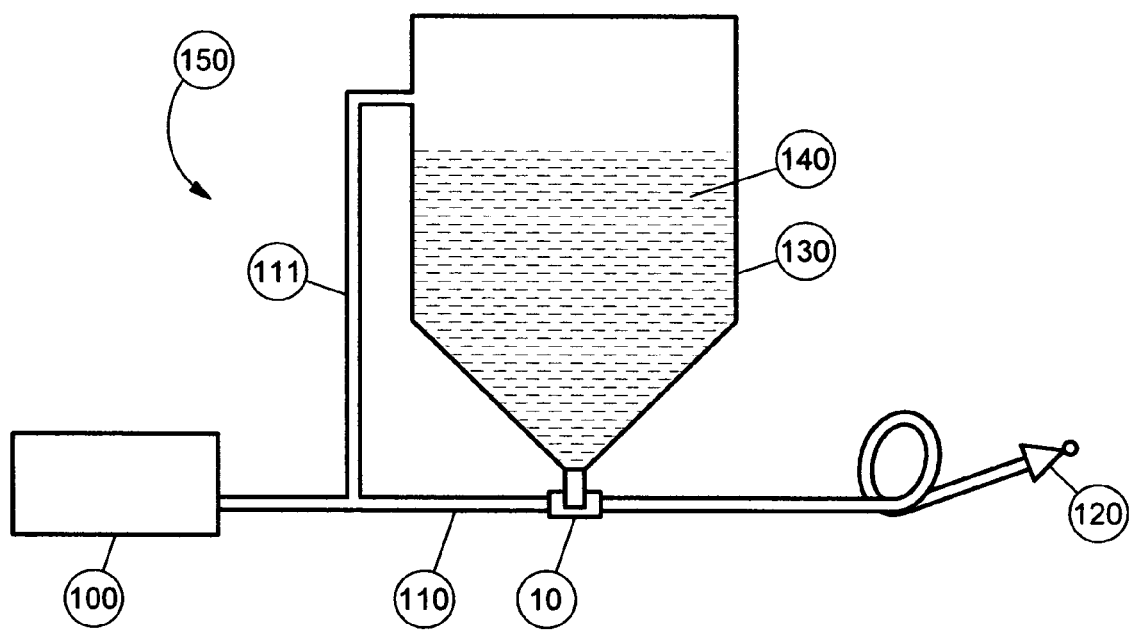
FIG. 1 is a diagram of a blasting system incorporating the media control valve of the present invention.

FIG. 1 illustrates a typical system in which the media control valve of the present invention may be employed. In FIG. 1, a media control valve 10 is part of a blast system 150 used to treat a surface by projecting a media 140 at the surface. Media 140 typically consists of solid particles, such as sand, shot, nut shells, sodium bicarbonate, aluminum oxide, other abrasives and the like depending on the surface being treated and the materials(s) being removed from the surface. Blast system 150 includes a fluid supply 100 which supplies a fluid stream through conduit 110. Line 111 that the pressure in the media vessel is equal to or balanced with conduit 110 so that media 140 can flow by gravity with or without slight differential pressure assist. Typically, the fluid employed is compressed air, though any readily available, relatively inert carrier fluid may be employed. Media 140 may be stored in a media vessel 130 and supplied to the fluid stream within conduit 110 through actuation of media control valve 10. The fluid stream and entrained media 140 then pass through conduit 110 to a nozzle 120 where they are directed at a surface to be treated.

Figure 2:
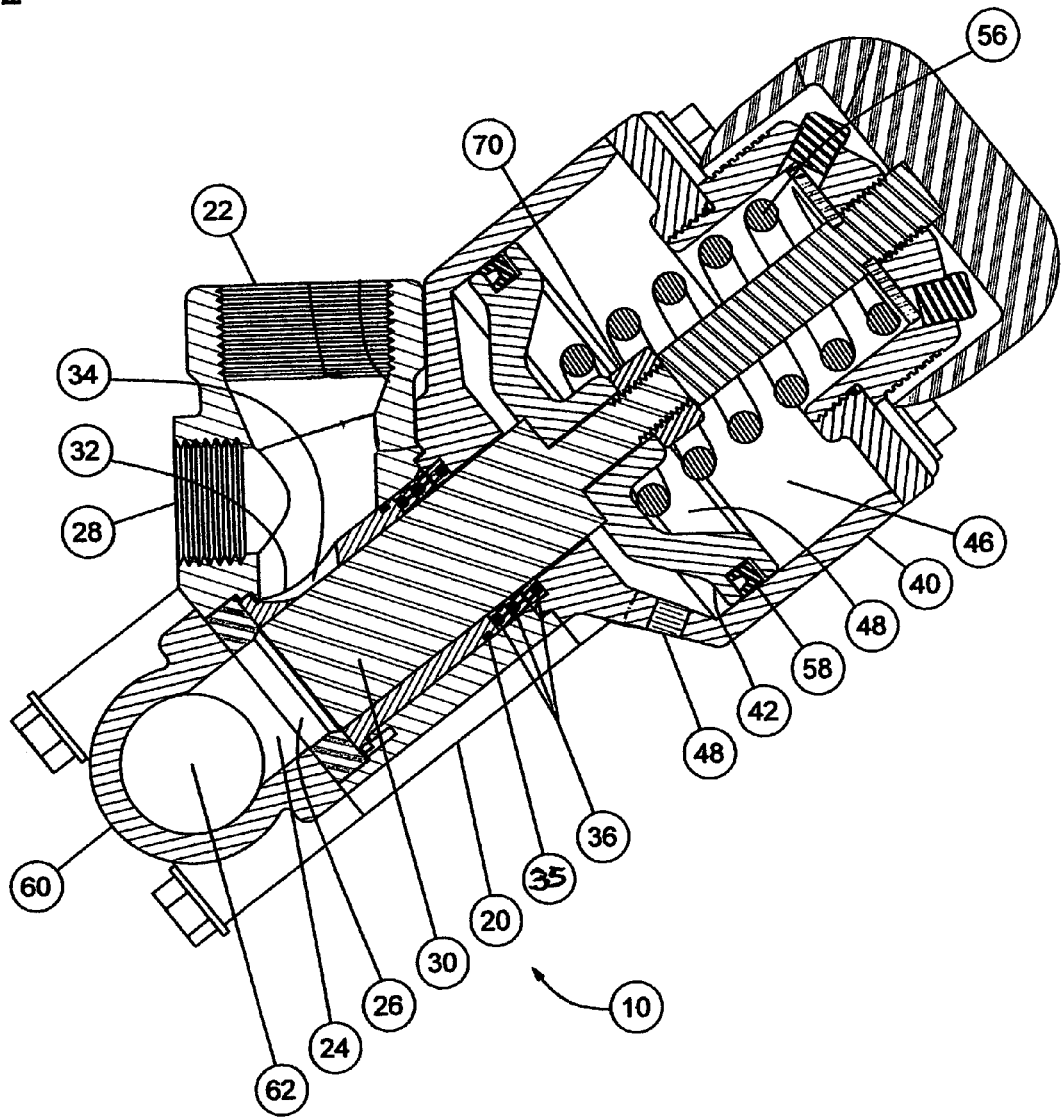
FIG. 2 is a cross-sectional side view of a media control valve according to an aspect of the present invention.

Referring now to FIG. 2, in one embodiment media control valve 10 may include a valve body 20 having a media inlet 22 and a media outlet 24. A plunger 30 is positioned within valve body 20 and a sleeve 32 is positioned between valve body 20 and plunger 30. A sleeve o-ring seal 35 is positioned between the sleeve 32 and valve body 20. The o-ring seal blocks the migration of any particles which may migrate into any space between the sleeve and the body. Sleeve 32 may include a media opening 34 that allows media to pass from media inlet 22 to media outlet 24 when plunger 30 is not blocking such flow. In this embodiment, media control valve 10 further includes a housing 40 that is connected to valve body 20. A piston 42 is connected to plunger 30 and positioned within housing 40. A base 60 is connected to valve body 20 such that it communicates with media outlet 24.

Typically, this type of valve is employed in a system wherein the ON/OFF feature is remote. In this configuration a pneumatic signal at connection 48, typically compressed air, utilizes pressure to force the piston 42 and attached plunger 30 to reciprocate or slide to clear the sleeve opening 34 and allow abrasive flow. There must be sufficient pressure to generate enough force on the piston to overcome the valve spring 56. When the signal is removed from signal port 48 and the compressed air is allowed to vent to atmosphere through signal port 48, the valve spring 56 pushes the piston 42 and attached plunger 30 to block sleeve orifice 34 and stop abrasive flow. In addition, the spring 56 forces the plunger 30 to seal against valve seat 26 and prevents the compressed air from leaking from the valve body to fluid passage 60 within base 60. The control signal typically comes from a manually operated valve or switch that is located at the operator. In some installations electronic and electric controls are used to control pneumatic signal.

Valve body 20 may be constructed in any manner and of any materials that provide valve body 20 the desired configuration and durability. For example, valve body 20 may be constructed with media inlet 22. Media inlet 22 may be constructed in any manner that allows it to receive media. For example, media inlet 22 may be constructed to connect to a media vessel 140 (FIG. 1). When media inlet 22 is constructed to connect with a media vessel, it may be constructed to connect in any manner that provides a secure connection and allows media to flow into valve body 20 from the media vessel. For example, media inlet 22 may be threaded, or otherwise provided with a fitting such that it may mate with a connector attached to the media vessel.

Valve body 20 may also be constructed with media outlet 24. Media outlet 24 may be constructed in any manner that allows media to pass from valve body 20 into a fluid passage 62 within base 60 is connected to conduit 110. For example, media outlet 24 may be an aperture of any size and shape capable of delivering media in an adequate volumetric flow through conduit 110 (FIG. 1), and, most typically, to a blast nozzle 120 (also FIG. 1). In preferred embodiments, media outlet 24 may be shaped as a circular hole.

Valve body 20 is constructed to house plunger 30. Valve body 20 may include an open area having a shape corresponding to plunger 30. Valve body 20 may also be constructed to allow sleeve 32, sleeve o-ring seal 35, seals 36 or seat 26 to reside within valve body 20. For example, the opening in valve body 20 for receiving plunger 30 may be large enough to also accommodate sleeve 32 with o-ring between sleeve 32 and valve body 20 or seals 36 between plunger 30 and valve body 20. Similarly, valve body 20 may include a portion shaped to accommodate seat 26, typically adjacent to media outlet 24.

Valve body 20 may also be constructed with a mechanism for allowing the media to pass out of the media vessel without passing into the conduit. For example, valve body 20 may include a bypass or cleanout 28. Cleanout 28 may be constructed in any manner which allows the media to flow out of the media vessel without entering the conduit. For example, cleanout 28 may include an opening in valve body 20 communicating directly with media inlet 22. Typically during operation of media control valve 10, cleanout 28 is closed. Cleanout 28 may also include an opening onto which a cover may be mated when it is desired to close cleanout 28. Alternative cleanout systems may be employed as well, such as, by way of example a cleanout valve or the like, permitting quick opening and closing.

Valve body 20 may be constructed of any material or materials that have sufficient durability for valve body 20 and are compatible with media and other materials which may come in contact with valve body 20. For example, valve body 20 may be constructed of various metals and metal alloys. Preferably, valve body 20 is constructed of an aluminum alloy because of its relatively low weight and cost and relatively high strength in comparison to industry standards. Preferably, the aluminum alloy has a hard-coat anodized finish to improve its abrasion resistance. In one embodiment, valve body 20 is constructed of 356 T6 aluminum alloy with a hard-coat anodized finish. The body material may be other materials as well, such as, by way of example, a low carbon steel for better abrasion resistance and durability.

Valve body 20 may be constructed by any method capable of producing valve 20 from a desired material or materials of construction. For example, where valve body 20 is constructed of certain metals, valve body 20 may be cast, machined or both. Preferably, valve body 20 is constructed by casting, and, more preferably, investment casting, because casting is relatively inexpensive and produces a relatively high quality product having sufficient dimensional stability.

Figure 3:
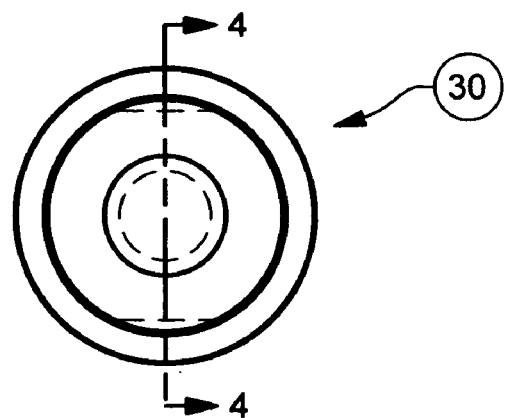
FIG. 3 is an end view of the plunger.
Figure 4:
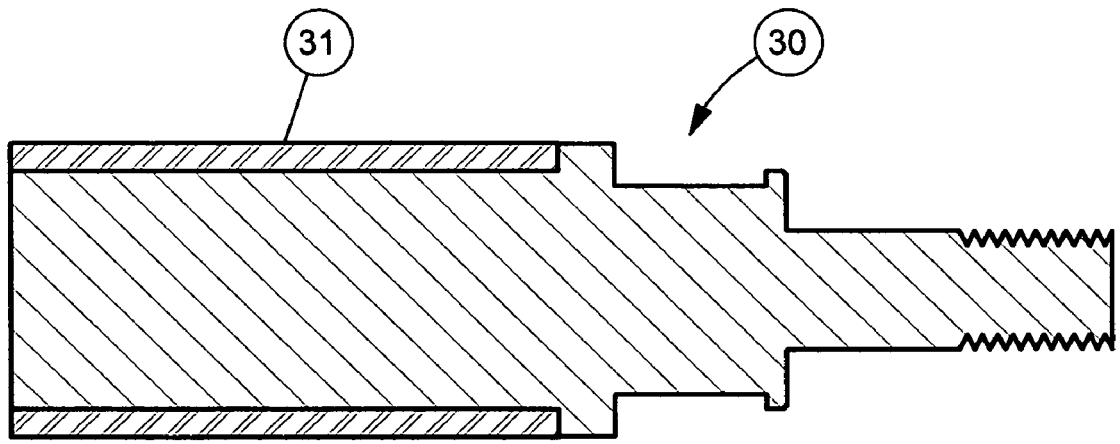
FIG. 4 is a cross-sectional view of the plunger taken along line 4-4 of FIG. 3.

Referring now to FIGS. 3 and 4, plunger 30 may be constructed in any manner and using any materials resulting in plunger 30 having the shape and durability to selectively prevent flow of media through valve body 20. For example, plunger 30 may be constructed in any shape that may mate with valve body 20, sleeve 32 and seals 36 to selectively prevent flow of media from media inlet 22 to media outlet 24. In order to selectively prevent flow of media, plunger 30 is typically constructed such that it may move within valve body 20, selectively exposing a media opening 34 in sleeve 32 and allowing the media to flow from media inlet 22 to media outlet 24. Typically, plunger 30 is cylindrical and of uniform cross-section.

Plunger 30 is constructed to mate with piston 42 (See FIG. 2). For example, plunger 30 may be threaded at one end, such that it may be mated to piston 42 with a threaded nut 70. Alternatively, plunger 30 may thread directly into piston 42 or be connected with another connector known to those of skill in the art.

Plunger 30 may be constructed of any material or materials that are sufficiently durable and inert to selectively prevent the passage of media through or past plunger 30 and to provide long life of plunger 30. For example, plunger 30 may be constructed of the same material or materials as valve body 20. However, as plunger 30 may be subject to more wear than valve body 20, it is preferred to construct plunger 30 of a more durable material than valve body 20: For example, plunger 30 may be constructed of steel, such as 304 stainless steel, with harder material, such as tungsten carbide, on the outer, lower portion 31 of plunger 30. These materials are selected due to their relatively high strength and dimensional stability. Plunger 30 may be made by any conventional method to produce the desired shape from the material or materials of construction. For example, plunger 30 may be constructed by the same method as valve body 20. However, it should be understood that the material chosen for the plunger is not a limiting feature of the design.

Sleeve 32 may be constructed in any manner and of any materials to produce a desired configuration to be contained within valve body 20 and to mate with plunger 30. For example, sleeve 32 may be constructed as a cylindrical annulus where plunger 30 is cylindrical and valve body 20 contains a cylindrical opening therein. Sleeve 32 may be constructed with a media opening 34 to control the flow of media from media inlet 22 to media outlet 24. Media opening 34 may be constructed in any shape that controls the flow of media 140 from media inlet 22 to media outlet 24 as desired when valve 10 is open. The longitudinal axial position of bolt 71 can be adjusted to limit the travel of the plunger thus allowing the user infinite control of the flow area of sleeve opening 34 in order to meter the flow of abrasive.

Typically, and as shown in the PRIOR ART drawings FIGS. 5 and 6, the sleeve 32 comprises an outer jacket 37 with a hardened liner 33 is placed on the jacket to increase the life of the sleeve and valve particularly in the area where the plunger and sleeve liner 33 are in sliding contact during use of the valve. As best shown in FIGS. 5 and 6, the sleeve/liner assembly of the PRIOR ART incorporated a flush junction 35 between the sleeve and liner. Specifically, the sleeve 32 consisted of a hardened liner 33 (tungsten carbide or hardened steel) jacketed by jacket 37 made of a softer material. The hard liner is for abrasion resistance and the softer jacket is for protection of the hard material which tends to be brittle. In addition, the softer jacket is much easier to form, machine, shape, or manufacture to final dimensions for assembly into the valve body. Typically, the hard liner is jacketed and bonded with stainless steel or other material with the ID of the jacket being flush with the ID of the hard liner, as shown at junction 35. The plunger 30 is of the same type construction, except that the jacket is a hard material and the inside is a softer more workable material. In many applications, tungsten carbide or hardened steel is used for the hard materials. However, other hard materials such as silicon nitride or tool steel may be used.

Figure 7:
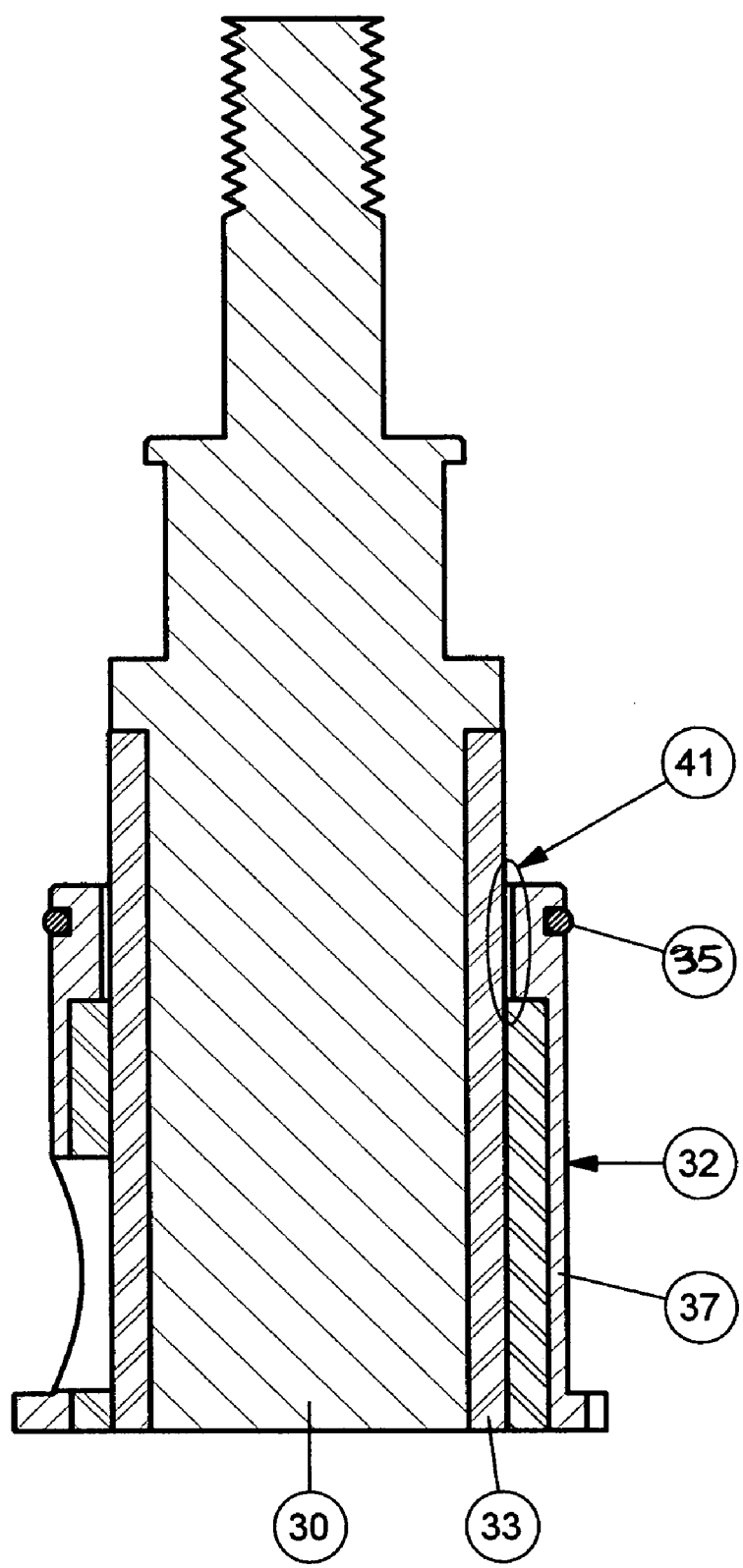
FIG. 7 is a side elevation view of a sleeve according to one embodiment of the present invention.

As shown in FIG. 7, in the preferred embodiment the sleeve/liner assembly is modified to provide a gap 41 between the plunger 30 and the sleeve 32 at the junction of the liner 33 and the jacket 37. The improved design with gap or offset eliminates the seizing and premature wear problems associated with the prior designs. The gap or offset 41 is sized as such that any particles that propagate and accumulate into the void will roll against other particles or adjacent surfaces instead rubbing against either the stainless portion of the sleeve 32 or the plunger 30. This rolling eliminates or minimizes the abrasion on the stainless ID of the sleeve 32. Also, harder particles cannot dig into the stainless ID of the sleeve. Basically, particles can only "rub" only on hard surfaces which should crush the particles and not bind. The adjacent plunger seals 36 are subject to less wear due to the easier particle separation from the plunger as created by the gap. The o-ring seal 35 is a static seal that prevents larger abrasive particles from flowing between the significantly larger gap between the sleeve OD and the ID of the body. This limits the size of the particles that are able to migrate into the gap to a size that is small enough to pass between the plunger and sleeve.

In the preferred embodiment, one or more seals 36 may be positioned between plunger 30 and valve body 20 to prevent media, fluid from the conduit or other contaminants from passing between valve body 20 and housing 40. In a preferred embodiment, three seals 36 are positioned between plunger 30 and valve body 20 to prevent contamination. Typically, the likelihood of contamination is much greater from valve body 20 to housing 40 than the reverse. Accordingly, seals 36 are typically oriented to face valve body 20. In some instances, such as where the pressure within housing 40 may exceed the pressure within valve body 20, one or more of seals 36 may be oriented to face housing 40. In such instances, it is preferred that seals 36 closest to housing 40 be faced toward housing 40. In one embodiment, several seals 36 are formed as a unitary structure. For example, three seals may be formed as a single solid piece of material.

Seals 36 may be formed out of any material that will provide an adequate seal with sufficient durability. For example, seals 36 may be formed of a resilient, pliable material, such as some polymers. The material may also be abrasion resistant and have a low coefficient of friction. In some instances, seals 36 may be constructed of an elastomer. Preferably, seals 36 are constructed of molythane because it is self-lubricating or urethane because of its abrasion resistance. Seals 36 may be constructed by any method that produces seals 36 having the desired seal and durability out of the material or materials of construction. For example, seals 36 may be constructed by molding and polymerization of a prepolymer.

While certain features and embodiments of the invention have been described in detail herein, it should be readily understood that the invention includes all modifications and enhancements within the scope and spirit of the following claims.

What is claimed is:

1. In a media control valve of the type having a valve body having a media inlet and a media outlet for delivering particulate media through the valve; a movable plunger positioned within the valve body for metering the flow of particulate media; a sleeve positioned within the valve body for receiving the plunger; a media opening in the sleeve; a piston positioned within the valve body and connected to the plunger, wherein the plunger is constructed and arranged to be movable by the piston with respect to the media outlet to provide all metering positions from a fully closed position to a fully open position, the sleeve having improvements comprising:

an outer jacket positioned within the body, the jacket made of a first material having at least one ID sufficient to accommodate the plunger and having a longitudinal length accommodating the full movement of the piston;

a liner placed inside a portion of the jacket and having an ID sufficient to accommodate the plunger, wherein the ID of the liner is smaller that the at least one ID of the jacket, and wherein the jacket is of a longitudinal length longer than the longitudinal length of the liner, and wherein the full movement of the plunger extends along the internal surfaces of both the jacket and the liner, whereby the difference in the ID's of the jacket and the liner creates a gap between the plunger and the jacket permitting particulate media to propagate and accumulate in the gap as particulate media is delivered through the valve.

2. The valve of claim 1, wherein the outer jacket is made of a material that is softer than the material of the liner.

3. The valve of claim 1, wherein the gap is larger than the particles that are able to propagate and accumulate therein.

4. The valve of claim 3, wherein the gap is several multiples larger than the particles to allow rolling of particles therein.

5. The valve of claim 1, including a resilient seal between the jacket and the valve body.

* * * * *